(12) United States Patent
Catchpole et al.

(10) Patent No.: US 7,441,002 B1
(45) Date of Patent: Oct. 21, 2008

(54) ESTABLISHING DATA CONNECTIONS

(75) Inventors: Andrew Catchpole, Lowestoft (GB);
Timothy Midwinter, Ipswich (GB);
Gary Crook, Manningtree (GB); **Robert
G Brockbank**, Woodbridge (GB)

(73) Assignee: **British Telecommunications public
limited company**, London (GB)

( * ) Notice: Subject to any disclaimer, the term of this patent is extended or adjusted under 35 U.S.C. 154(b) by 811 days.

(21) Appl. No.: 10/110,476

(22) PCT Filed: Nov. 13, 2000

(86) PCT No.: PCT/GB00/04342

§ 371 (c)(1),
(2), (4) Date: Apr. 12, 2002

(87) PCT Pub. No.: WO01/35602

PCT Pub. Date: May 17, 2001

(30) Foreign Application Priority Data

Nov. 12, 1999 (GB) .................................. 9926865.8

(51) Int. Cl.
*G06F 15/16* (2006.01)
(52) U.S. Cl. ..................... 709/205; 709/204; 709/207
(58) Field of Classification Search .......... 709/204–207
See application file for complete search history.

(56) References Cited

U.S. PATENT DOCUMENTS

| | | | | |
|---|---|---|---|---|
| 5,490,247 | A * | 2/1996 | Tung et al. | 345/501 |
| 5,909,543 | A * | 6/1999 | Tanaka et al. | 709/204 |
| 6,101,532 | A * | 8/2000 | Horibe et al. | 709/206 |
| 6,148,068 | A * | 11/2000 | Lowery et al. | 379/202.01 |
| 6,175,831 | B1 * | 1/2001 | Weinreich et al. | 707/10 |
| 6,237,026 | B1 * | 5/2001 | Prasad et al. | 709/204 |
| 6,363,352 | B1 * | 3/2002 | Dailey et al. | 705/9 |
| 6,434,599 | B1 * | 8/2002 | Porter | 709/204 |
| 6,437,818 | B1 * | 8/2002 | Ludwig et al. | 348/14.09 |
| 6,636,888 | B1 * | 10/2003 | Bookspan et al. | 709/203 |
| 6,671,262 | B1 * | 12/2003 | Kung et al. | 370/260 |
| 6,732,103 | B1 * | 5/2004 | Strick et al. | 707/10 |
| 6,782,413 | B1 * | 8/2004 | Loveland | 709/204 |

FOREIGN PATENT DOCUMENTS

| | | |
|---|---|---|
| EP | 0781015 A | 6/1997 |
| EP | 0903921 A | 3/1999 |
| WO | WO 97 48050 | 12/1997 |

* cited by examiner

*Primary Examiner*—Saleh Najjar
*Assistant Examiner*—Faruk Hamza
(74) *Attorney, Agent, or Firm*—Nixon & Vanderhye, PC

(57) ABSTRACT

A method wherein a first user obtains an identifier for a desired destination user, makes a request to a server for a data communication with that desired destination user, retrieves a computer network address from a directory entry for that desired destination user, retrieves the source computer network address from the request packet from the first user, and sends requests to the computers of both users for return of respective stored unique identifiers. When these respective unique identifiers are received at the server, a check is made to see that they correspond to only one respective entry in a database, and the server then sends a message to one of the computers to make a data call to the other computer. Users register initially and download a helper application which stores the user's respective unique identifier together with, in a preferred embodiment, a unique password, which is also stored in the respective entry in the database. The helper launches a NetMeeting application passes its associated user's names.

13 Claims, 1 Drawing Sheet

ESTABLISHING DATA CONNECTIONS

This application is the US national phase of international application PCT/GB00/04342 filed 13 Nov. 2000 which designated the U.S.

FIELD OF THE INVENTION

The present invention relates to a method of establishing a data connection between two computers on a network, particularly when the users at those computers wish to hold a data sharing session.

BACKGROUND OF THE INVENTION

An application called "NetMeeting", herein referred to as NM, is marketed by Microsoft Corporation for enabling two users to hold a data sharing session over a data communication between their two computers, each computer running a NM application. Before the present invention, one way of initiating a data sharing session would be for the initiating user to ask the other user for the network address of his computer, and upon receipt of that other network address the initiating user would then instruct the NM application running on his computer to make a data call to that other computer. Alternatively, users can arrange for their NM application to connect automatically upon launch to a selected one of several known directories, which creates an entry of the user's details for others to see in real time when they access that directory. Once connected to the directory, a user can select one of the entries, and his NM application can obtain the destination details for making a data call to the selected person (destination party). This requires that an initiating user knows which directory the desired destination party is using, and what name the destination party is using.

SUMMARY OF THE INVENTION

According to a first aspect of the present invention there is provided a method of establishing a data connection between a first of a plurality of computers on a network and a second of said plurality of computers, each of the first computers being logically associated with a respective user, the method comprising the steps of:

storing in a directory database, for each user, a respective entry comprising fields for at least the network address of a computer currently associated with that user, and a unique identifier for that user;

storing at each of the computers a respective data item comprising a field containing the respective unique identifier for the logically associated user;

responding at a server to receipt of a message from a first user at the first computer indicative of a desired data communication with the second computer and containing identifying data for the second user, the identifying data corresponding to a said directory entry field, by accessing the directory in accordance with said identifying data, and, if a unique entry is found for that second user, retrieving the computer network address of that entry, sending from that server to the second computer at that retrieved computer network address and to the first computer at the source network address of that received message, a respective message requesting a return message containing the field of the respective stored data item;

responding to receipt at the server of each respective return message by accessing the directory in accordance with the content of the field of the respective return message, and checking that only a single entry is returned by this accessing step in the event that only a respective single entry is returned for both return messages, sending to one of the first and second computers a message instructing that one computer to make a data call and containing for the destination address for that data call the network address of the other of the first and second computers.

According to a second aspect of the present invention there is provided a method of establishing a data connection between a first of a plurality of computers on a network and a second of said plurality of computers, each of the first computers being logically associated with a respective user, the method comprising the steps of:

storing in a directory database, for each user, a respective entry comprising fields for at least the network address of a computer currently associated with that user, a unique identifier for that user and a respective unique password;

storing at each of the computers a respective data item comprising fields containing the respective unique identifier for the logically associated user and a respective unique password;

responding at a server to receipt of a message from a first user at the first computer indicative of a desired data communication with the second computer and containing identifying data for the second user, the identifying data corresponding to a said directory entry field, by accessing the directory in accordance with said identifying data, and, if a unique entry is found for that second user, retrieving the computer network address of that entry, sending from that server to the second computer at that retrieved computer network address and to the first computer at the source network address of that received message, a respective message requesting a return message containing the fields of the respective stored data item;

responding to receipt at the server of each respective return message by accessing the directory in accordance with the content of one of the fields of the respective return message, and comparing the content of the other of the fields of the respective return message with the content of the corresponding directory entry field; and in the event of a successful comparison for both return messages, sending to one of the first and second computers a message instructing that one computer to make a data call and containing for the destination address for that data call the network address of the other of the first and second computers.

Such a method is advantageous in reducing the effort needed for a user to establish a secure data connection with a desired other user, and enables the data connection to be established automatically in response to a single input from the user, which in preferred embodiments using Computer Telephony Integration (CTI) is a telephone call to the desired user, requested of a CTI server by locating the desired user in a directory database via a screen-based search facility and passing to the CTI server a message requesting a call to be made to the directory number selected from the search results. In preferred embodiments, the server knows the telephone of the requesting user by retrieving the source address from the request message and accessing a set of stored mappings (logical associations) between computer network addresses and directory numbers. The creation of these mappings is not part of the present invention, and if the reader requires further information regarding this he is referred to international patent application publication number WO 99/51015.

BRIEF DESCRIPTION OF THE DRAWING

Specific embodiments of the present invention will now be described by way of example with reference to the drawings in which.

DETAILED DESCRIPTION OF THE INVENTION

Acronyms used in the specific description

Figure 1:
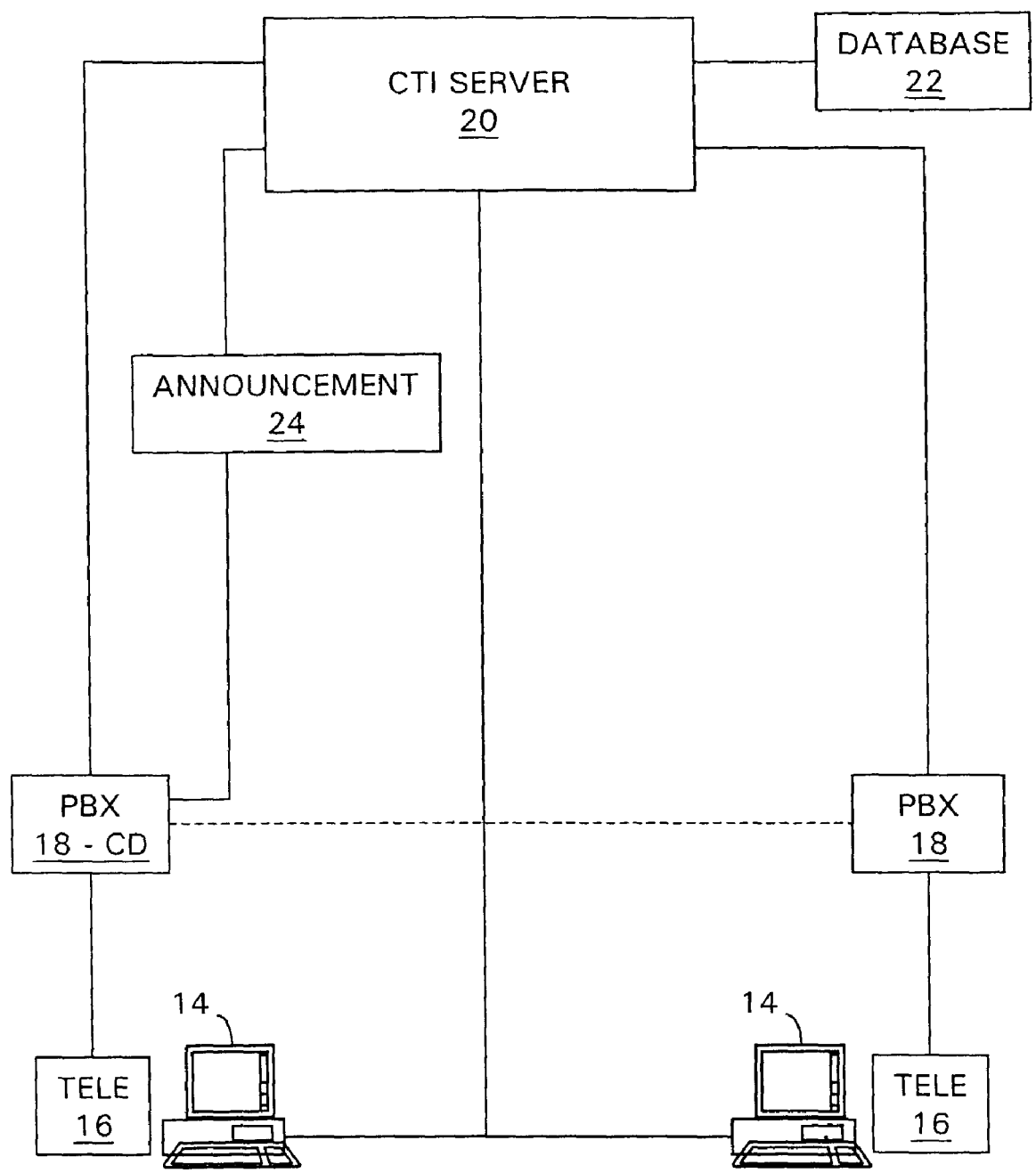
FIG. 1 is a schematic diagram showing the general telephony and data arrangement of the present invention.

| | |
|---|---|
| BT | British Telecommunications public limited company |
| CLI | Calling Line Identity |
| CTI | Computer Telephony Integration |
| DN | directory number |
| GUI | Graphical User Interface |
| HTML | hypertext markup language |
| IPA | Internet Protocol Address |
| NM | NetMeeting |
| PBX | Private Branch Exchange |

In FIG. 1, each of a plurality of users 10 (not shown) of a network 12 is associated with a respective computer 14 and a respective telephone 16 which is an extension of one of a plurality of local CTI-enabled PBXs 18 arranged for operation in association with a common CTI server 20. In this specific embodiment the PBXs 18 are Nortel Meridians, and the telephones 16 are Meridian Featurephones capable of on hook dialing.

Each of the users 10 is employed by a common employer, in this specific embodiment BT, and has a respective entry in a common corporate telephone directory held on a database 22 which is accessed from the user's computer 14 via the server 20, and for a user to be an originating user in accordance with this specific embodiment he needs to be a registered user of a service for making a telephone call by clicking on a MakeCall button associated with a desired destination user's displayed entry from the common telephone directory. In this specific embodiment, this service is BT's ClickDial service, and the server 20 is referred to as the ClickDial server.

In brief, a user 10 registers with the ClickDial service by accessing a ClickDial Home Page and clicking on a Registration Button in that page. This sends a request packet from the user's computer 14 to the ClickDial server 20, requesting the download of the ClickDial Registration Page. The ClickDial server 20 receives that request packet, and retrieves the source IPA from its header, generates a nine digit pseudorandom number and includes it in an HTML forms page (i.e. the Registration Page), and sends that page to the user's computer 14. This page has boxes for the user to enter identification data enabling the ClickDial server 20 to access the database 22 and locate the user's entry. The data required is the user's Operational Unit Code and his Employee Identification Number (EIN). Although the EIN is unique and would be sufficient to identify the user, the combination of these two data items provides a degree of security. Aspects of this ClickDial registration procedure are the subject of the applicant's international patent application publication number WO 99/51015.

The Registration Page contains instructions requesting the user to make a telephone call from his associated PBX telephone 16 to a specified destination DN, which is a DN within the numbering range of a particular PBX 18-CD. On receipt of a call from that user, that PBX 18-CD retrieves the CLI from the signalling information and passes that to the ClickDial server 20. The ClickDial server 20 instructs the PBX 18-CD to connect that call to a recorded announcement facility 24, and instructs the recorded announcement facility 24 to play an instruction for the user to dial on his keypad the nine digit number displayed on his computer.

The PBX 18-CD reports received digits to the ClickDial server 20, which then compares the original nine digit number with the digits received at the PBX 18-CD, and, if they match, records that user as an authorised user of the ClickDial service, and creates a ClickDial cookie at the user's computer 14 containing a pointer to a location in the database 22 storing the actual data corresponding to that cookie. For convenience, where a distinction needs to be made, the terms cookie pointer and cookie data are used. In the preferred embodiment, the cookie data comprises the user's DN (known from the received CLI) and the identity of the PBX 18 local to that user (retrieved from the database 22 as one of the items of data stored for each user). The ClickDial server 20 completes its registration procedure by amending a directory cookie at the user's computer 14 to request download of directory search results in ClickDial form instead of normal search result form. In the display of a ClickDial directory search result there is a ClickDial button adjacent to each displayed retrieved entry.

When the user 10 accesses the directory service and enters the name of a desired called user, the ClickDial server 20 will perform a search to locate all entries matching that search criterion and send a page displaying the search result, i.e. one or more retrieved entries, each with their associated ClickDial button, i.e. the MakeCall button referred to above. The user clicks on the appropriate ClickDial button, and a ClickDial application on that computer is activated to send to the ClickDial server 20 a MakeCall request packet containing the contents of the user's ClickDial cookie and the DN associated with that entry. The ClickDial server 20 now accesses the cookie data and sends an instruction to the user's local PBX 18 for a call to be made from the source DN to the destination DN. With the speed of modern telecommunications, the user hears ringing tone a small fraction of a second after clicking on a ClickDial button.

Suppose that the user 10 wishes to share data on his computer with the computer of a desired destination user, then both users need to be registered users of the Share Data service of this specific embodiment and will each run a data sharing application marketed by Microsoft Corporation under the name "NetMeeting" (NM). As this is a companion service to the ClickDial service, this service has been called ClickData by BT. It will be appreciated that any other alternative data sharing application can be used.

To register for the ClickData service, the user accesses a ClickData Home Page from the ClickDial server 20, which is arranged to provide the ClickData service in addition to its ClickDial service. This page has a text box for the user to enter the version number of his NM application, and a button for requesting the download of a helper application, hereinafter referred to as a helper. In a variant, different versions of the helper are available from that page, and the user selects the helper appropriate to the version of his NM application. The ClickDial server 20 is arranged to provide the ClickData service in addition to its ClickDial service, and being generic to both services is therefore hereafter referred to as the Click server 20.

The user 10 enters his NM version number and clicks the helper download button. The Click server 20 responds to receipt of this request by downloading the requested helper and an HTML form containing a box for the entry of an email address.

The user 10 enters his email address in the form that it is recorded in the database 22, email address being one of the items of data stored for each user, and clicks on a Submit button in the form. The Click server 20 receives the submitted form, retrieves the email address and uses it to access the database 22, checks that only one entry is retrieved, i.e. that the email address is unique in the database 22, and, if so, generates a unique nine digit pseudorandom number, referred to as the ClickData Key (CDK) or alternatively "password", emails it to the user 10 at that email address, and adds a CDK field containing that CDK to that user's entry in the database 22. In this preferred embodiment the CDK field exists only when the user has registered for ClickData. In variants, each entry has a CDK field, i.e. the CDK is one of the items of data stored for each user, but it will be appreciated that until a user has registered for ClickData his CDK field will contain a null value.

The Click server 20 then sends a page to the user containing text appropriate to the condition "OK" to inform him that his email address has been recognised as a unique address in the database 22. If, for example, the email address had not been recognised, or more than one entry having that email address had been found, then the text in that page would be appropriate to the condition "NOT OK".

The user 10 having successfully downloaded and installed the helper, now includes the helper as an application to be run at start up of his computer 14. The user 10 also runs the helper and accesses its configuration area, where he enters his email address, the CDK received by email, his familiar name and his surname, these being referred to as user-name and user-surname. He then clicks on a Register button displayed on the screen, and the helper forwards a packet containing that data to the Click server 20.

The Click server 20 receives that packet, retrieves the source IPA from the packet header and the data from the packet payload, accesses the database 22 with the received email address, retrieves the associated stored CDK from that user's entry in the database 22 and compares it with the CDK sent by the helper. If there is a match, the Click server 20 sends a page to the user's helper containing "OK" text to inform him that his CDK has been recognised and that he has been registered, and adds to the user's entry in the database 22 a corresponding field containing the retrieved IPA. Again, in a variant, the IPA is one of the items of data stored for each user, but for this variant it will be appreciated that until a user has registered for ClickData that field will have a null value.

If for any reason the registration had not been successful (i.e. was an invalid registration attempt), the text would have been appropriate to "NOT OK", and the user would check the data in his helper and click on the Register button again. On receipt of the third successive invalid registration attempt the text in the page will include "CDK removed from Database" or in a variant "CDK removed from Directory", and to continue the user would have to request a new CDK.

To make a Shared Data call using ClickData, the user looks up the intended recipient, i.e. the destination user, in the common directory held on the database 22, and clicks on the associated ClickDial button. The Click server 20 receives a MakeCall request containing the destination DN and the user's cookie (i.e. the pointer), retrieves the source IPA from the header of that request and the destination DN from the MakeCall request, and retrieves from the user's cookie data his source DN and the identity of his local PBX, and instructs the user's local PBX to make a telephone call to the destination DN.

The Click server 20 searches the database 22 for the destination DN and, if only one matching entry is found, retrieves the stored IPA of that entry. If no match or multiple matches are found, then no further action as taken, as the destination user is either unknown or ambiguous.

Assuming that only one match was found, the Click server 20 sends a ConfirmData message to both IPAs. In simple terms, it is asking the respective computers "Are you there?"

If helpers are running at those addresses, i.e. the computers have been started up, then they each respond with their registration details, i.e. email address and CDK plus NM version. For each response, the Click server 20 accesses the directory in accordance with the respective email address, retrieves the stored CDK, and checks that it matches the CDK supplied by the helper. If the supplied CDK matches the stored CDK, then that response is termed a successful response. In a simplified version, the server simply checks that the email addresses each matched just a single entry in the directory.

If both computers make a successful response, the Click server 20 sends to each helper a respective "Can Share Data" message containing the NM version corresponding to the other helper.

If a helper does not send any response within a preset timeout, the Click server 20 searches the database 22 on the basis of the IPA corresponding to that helper and deletes that IPA from all retrieved entries (also referred to as records).

On receipt of the "Can Share Data" message, the helper displays a "Share Data" button. Both users click on their respective "Share Data" buttons, and their respective helper retrieves the user-name and user-surname from its configuration area, passes this data to the respective NM application for use in the initial information that it sends, launches the respective NM application, and sends a "Ready to Share Data" message to the Click server 20.

When the Click server 20 has received a "Ready to Share Data" message from both computers, it sends a MakeData-Call message to the originating user's helper.

On receipt of the MakeDataCall message, the originating user's helper commands its associated NM application to make a data call to the destination IPA.

The Click server 20 will command Telephony Call Cleardown procedure on receipt of a clearCall event. Ordinarily, this will be when the originating and destination users have finished sharing data via their NM applications and put their telephone instruments in an on-hook state, but can be at any time after the originating user has initiated a ClickDial call to the destination user. On first receipt of a clearCall event in respect of the originator's DN (or possibly in respect of the destination DN), the ClickServer 30 sends an EndOfCall message to both helpers. On receipt of the EndOfCall message, each helper closes its associated NM application, if open, and sets its respective GUI to its initial state. The Click server 20 performs housekeeping to complete call records and reset timers, this being particularly needed where, for example, only one helper responded.

The helper also responds to clicking on the "Share Data" button by replacing this button in the GUI with a "Stop Sharing" button, which the user can click at any time during a data call. If the user clicks the "Stop Sharing" button while the telephony call is still in existence, his helper will close its NM. The far end NM will notice that the data session has closed, and will close itself. Both helpers will then revert to their "CanShareData" state, i.e. displaying the "Share Data"

button, and thereafter either user can initiate a new data call while that telephony call is still in existence.

It will be appreciated that the destination user does not have to be on a CTI-enabled PBX, or even on a PBX at all. As long as their phone number is in the directory against their name, this described embodiment will work. For example, they could use their mobile number.

Whereas in the above embodiment the CTI-enabled switch is a Nortel Meridian PBX, it will be appreciated that the present invention embraces other forms of switching function. For example, the switch can be a public network switch, such as a Nortel DMS100 switch which is used in known CTI arrangements in conjunction with a CompuCall CTI controller; and other forms of switching function include switches known as Automatic Call Distributor (ACD), Interactive Voice Response (IVR), and server PBX. Furthermore, the type of switching is not limited to any one form, and, in addition to switched circuit technology, includes Asynchronous Transfer Mode (ATM) switching, and Voice over Internet Protocol (VoIP) switching. With regard to this last form of switching, the switch can be a PBX having an Internet Card, or it can be a general purpose computer, e.g. one running Windows NT, having an Internet card, e.g. a Dialogic Internet card, and in this latter case the CTI controller function is provided by a program running in the computer, rather than in a separate controller. Furthermore, the telephones 16 can be connected to their respective computers (clients) 14 via Internet phone jacks, and in an alternative arrangement telephony can be provided for the user via a sound card in his client.

Thus, it can be seen that in general the present invention can be implemented in any computer controlled switch, by means of a suitable controlling program.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A method of establishing a data connection between a first of a plurality of computers on a network and a second of said plurality of computers, each of the first computers being logically associated with a respective user, the method comprising:
   storing in a directory database entries comprising fields for at least a network address of a computer currently associated with each user, and a unique identifier for each user;
   storing at each of the computers a respective data item comprising a field containing the respective unique identifier for the logically associated user;
   responding at a server to receipt of a message from a first user at the first computer indicative of a desired data communication with the second computer and containing identifying data for the second user, the identifying data corresponding to a field of said directory entries, by accessing the directory database in accordance with said identifying data, and, if a unique entry is found for the second user, retrieving the network address of said unique entry, sending from said server to the second computer at said retrieved network address and to the first computer at the source network address of said received message, a respective message requesting a return message containing the field of the respective stored data item;
   responding to receipt at the server of each respective return message by accessing the directory database in accordance with content of the field of the respective return message, and checking that only a single entry is returned by this accessing step
   if only a respective single entry is returned for both of said return messages, sending one of the first and second computers a message instructing said one computer to make a data call and containing for a destination address for said data call the network address of the other one of the first and second computers.

2. A method as claimed in claim 1, wherein each computer is arranged to run a respective data sharing application, and the data call is a message from the data sharing application at said one computer for starting a data sharing session with the data sharing application at said other computer.

3. A method as claimed in claim 1, wherein the step of sending to one of the first and second computers a message instructing that one computer to make a data call includes the substep of sending a message to the first and second computers for generating a display for inviting the respective users to send respective messages to the server to proceed with a data sharing session, and the substep of responding to receipt at the server of a respective message from both the first and second computers for proceeding with a data sharing session to send said message instructing the one computer to make said data call.

4. A method as claimed in claim 1, wherein said identifying data for the second user is a directory number.

5. A method as claimed in claim 4, further including storing a logical association between the network address of the first computer and a directory number for the first user, the directory number for the first user corresponding to a telephone extension of a CTI-enabled switch; retrieving, from addressing information of the received message indicative of a desired communication, the source address of the received message; accessing the stored logical association in accordance with the retrieved source address and obtaining the associated directory number; and sending from the server a CTI command to the CTI-enabled switch for a call to be made from the associated directory number to the directory number of the second user.

6. A method of establishing a data connection between a first of a plurality of computers on a network and a second of said plurality of computers, each of the first computers being logically associated with a respective user, the method comprising:
   storing in a directory database entries comprising fields for at least network address of a computer currently associated with each user, a unique identifier for each user and a respective unique password;
   storing at each of the computers a respective data item comprising fields containing the respective unique identifier for the logically associated user and a respective unique password;
   responding at a server to receipt of a message from a first user at the first computer indicative of a desired data communication with the second computer and containing identifying data for the second user, the identifying data corresponding to a field of said directory entries, by accessing the directory database in accordance with said identifying data, and, if a unique entry is found for the second user, retrieving the network address of said unique entry, sending from said server to the second computer at said retrieved network address and to the first computer at the source network address of said received message, a respective message requesting a return message containing the fields of the respective stored data item;

responding to receipt at the server of each respective return message by accessing the directory database in accordance with content of one of the fields of the respective return message, and comparing content of other ones of the fields of the respective return message with the content of the corresponding directory entry field; and if a successful comparison for both of said return messages occurs, sending to one of the first and second computers a message instructing said one computer to make a data call and containing for a destination address for said data call the network address of the other one of the first and second computers.

7. A method as claimed in claim 6, further including for each user, generating by the server the respective unique password, communicating said generated unique password from the server to the respective user, and entering at the respective logically associated computer by the respective user said generated unique password into the respective field of the respective data item.

8. A method as claimed in claim 7, wherein communicating said generated unique password comprises sending said generated unique password from the server to the respective user in a message addressed to a respective unique email address for the respective user.

9. A method as claimed in claim 8, wherein generating by the server the respective unique password is performed in response to receipt at the server of a request message sent from the respective logically associated computer.

10. A method as claimed in claim 9, wherein generating by the server the respective unique password comprises retrieving user identifying data from the received request message and checking that the retrieved user identifying data matches corresponding user identifying data in a field of the respective entry for the respective user.

11. A method as claimed in claim 10, wherein the retrieved user identifying data is the respective unique email address for the respective user.

12. A method as claimed in claim 6, wherein said identifying data for the second user is a directory number.

13. A method as claimed in claim 12, further including storing a logical association between the network address of the first computer and a directory number for the first user, the directory number for the first user corresponding to a telephone extension of a CTI-enabled switch; retrieving, from addressing information of the received message indicative of a desired communication, the source address of the received message; accessing the stored logical association in accordance with the retrieved source address and obtaining the associated directory number; and sending from the server a CTI command to the CTI-enabled switch for a call to be made from the associated directory number to the directory number of the second user.

* * * * *